United States Patent Office 2,962,372
Patented Nov. 29, 1960

2,962,372

COLUMBIUM AND TANTALUM SEPARATION

Raymond A. Foos, Cincinnati, Ohio, and Howard F. Gemperline, Tonawanda, N.Y., assignors to Union Carbide Corporation, a corporation of New York No Drawing. Filed Jan. 17, 1958, Ser. No. 709,451

8 Claims. (Cl. 75—121)

This invention relates to the separation of columbium and tantalum values from solid materials containing these metallic values.

The method presently employed for recovering tantalum and columbium values comprises several steps. The material containing the tantalum and columbium metal values is dissolved in an aqueous acid, such as hydrofluoric acid, to produce a solution containing the metal values and having a pH of from about 0.5 to about 2.0. In this leaching step it has been the practice to leach in the minimum quantity of hydrogen fluoride necessary to solubilize the starting material containing tantalum and columbium.

The acid solution is initially contacted with an organic solvent, e.g., methyl isobutyl ketone, with the result that the tantalum values become associated with the organic solvent and are preferentially extracted to the exclusion of the columbium values which are retained in the acid solution. The latter solution is then further acidified and subjected to further extraction with organic solvent. As successive extractions are effected less tantalum remains in the aqueous phase and the organic phase begins to extract more and more columbium values. After several such organic solvent extraction treatments, several extract fractions are obtained containing most of the columbium and tantalum values originally contained in the solid starting material. These fractions are then stripped of their metal values which are converted to the corresponding pentoxides. This method of separating the tantalum and columbium values entails the use of at least six successive extraction steps if pentoxides of high purity are to be recovered.

It is an object of this invention to provide a process for simultaneously extracting (co-extracting) columbium and tantalum values from an acid feed solution to produce a product substantially free from other metal values, particularly values of transition metals.

It is another object to provide a process for separating columbium and tantalum values by extraction techniques whereby the number of extraction operations is minimized.

Other objects will be apparent from the subsequent disclosure and the appended claims.

In accordance with the present invention, the tantalum and columbium-containing starting material is dissolved in a quantity of aqueous hydrofluoric acid solution sufficient to provide a hydrofluoric acid normality having an excess of 5.5 N over that required to solubilize the starting material. The acid solution is then further acidified with a strong mineral acid so that the total hydrogen concentration is at least about 12 N in excess over that required to solubilize the starting material. This highly acidic solution is then treated with a suitable, substantially immiscible organic solvent to co-extract the contained tantalum and columbium values. The columbium and tantalum values may then be separated from each other in the organic phase by stripping the organic phase with water or a suitable aqueous stripping solution which will selectively remove the columbium and tantalum values in that order.

More specifically, the dissolution of the columbium and tantalum values is effected generally by digestion of the columbium-and-tantalum-containing material in hydrofluoric acid. The resulting solution has a pH of from about 0.5 to 2.0 and contains the equivalent of from about 500 to about 600 grams of metal oxides per liter of solution.

To the acid solution is added additional hydrofluoric acid until the hydrofluoric acid concentration exceeds the minimum quantity of acid necessary to dissolve the tantalum and columbium values by about 5.5 normal. This solution is further acidified with a strong mineral acid such as nitric acid, hydrochloric acid, and particularly with hydrofluoric acid or with sulfuric acid until the hydrogen ion concentration exceeds that necessary to dissolve the starting material.

The acidified solution is then contacted with an organic extractant such as a lower aliphatic ketone, lower aliphatic ester, or lower aliphatic ether which is substantially immiscible with the aqueous acid solution. Methyl isobutyl ketone has been found to be a particularly suitable extractant.

The stripping of the metals from the organic phase may be effected by multiple-stage countercurrent technique employing water as the stripping agent. Any pure organic solution which is operable as an extractant is suitable for scrubbing the strip solution to remove impurities. In general practice, the stripping step and the organic scrubbing step are practiced at opposite ends of the extraction process, while the solution of the metal values is introduced into a stage intermediate between the two. Columbium is preferentially stripped. The columbium-containing extract passes in countercurrent relationship through the organic scrubbing step as it proceeds to the exit point of the process. Any tantalum which was stripped along with the columbium is removed from the columbium-laden aqueous phase and transferred to the organic scrubbing solution.

The stripping and scrubbing step is not the only manner in which stripping of metal values from the tantalum- and columbium-laden organic phase may be accomplished. A series of successive treatments with water may also be employed. For example, in a 2-step water treatment stripping technique, the first treatment would extract the columbium from the organic extracting solution, and the second would remove most of the tantalum. In any of these stripping variations, the organic phase is easily stripped of its metallic values and the stripped organic solvent may be recycled for extraction of a new batch of acidified solution. Tantalum-columbium separation factors of the order of 100 can be easily achieved from an acid fluoride solution or from mixed fluoride-sulfate acid system by the foregoing treatment.

In an example of the invention, an aqueous hydrofluoric acid solution was prepared containing 680 grams of a mixed metal oxide per liter of solution. The mixed metal oxide contained 480 grams of tantalum-columbium pentoxide and 200 grams of such elements as titanium, iron, zirconium, silicon, manganese, calcium, etc. The solution was further acidified by the addition of hydrofluoric acid and sulfuric acid to produce a solution having a hydrofluoric acid concentration 5.5 normal greater than that necessary to dissolve the mixed oxides, and a sulfuric acid concentration of 7.2 normal. This acidified solution and an equal amount of methyl isobutyl ketone were introduced into a mixer-settler apparatus at a rate of about 2.0 milliliters per minute. After approximately 92 minutes, essentially steady state conditions were obtained; analyses of intermittent samples of the raffinate and of the extract are shown in the following table.

| Operating Time, Min. | Composition of Equilibrium Aqueous Acid Raffinate, Percent | | | | Composition of Equilibrium Organic Extract, Percent | | | |
|---|---|---|---|---|---|---|---|---|
| | $Ta_2O_5$ | $Cb_2O_5$ | TiO | FeO | Extracted Ta | Extracted Cb | TiO | FeO |
| 6 | 2.5 | 7.5 | 43.0 | 10.5 | 98.6 | 95.2 | <0.5 | <0.2 |
| 34 | 2.5 | 4.5 | 48.5 | 10.5 | 98.8 | 96.0 | <0.5 | <0.2 |
| 60 | 2.0 | 2.5 | 50.0 | 10.5 | 99.0 | 98.0 | <0.5 | <0.2 |
| 92 | 1.5 | 2.5 | 52.0 | 10.5 | 99.4 | 98.2 | <0.5 | <0.2 |

As may be seen from the data in the table, the organic extract contained essentially tantalum and columbium whereas the aqueous raffinate consisted primarily of titanium and iron, with only small amounts of tantalum and columbium remaining. Other impurities in the raffinate were zirconium, silicon, manganese and calcium. At the conclusion of the extraction, 99.7 percent of the tantalum and 98.7 percent of the columbium were recovered in the equilibrium organic phase.

To illustrate the separability of the tantalum and columbium values from the organic extraction solution, about 300 milliliters of a hexone solution containing about 300 grams per liter of tantalum and columbium oxides in equal amounts were subjected to a seven-stage countercurrent stripping procedure. Pure hexone was fed into the first stage and water was fed to the last stage with the organic solution of the metal values being fed into the third stage of the stripping column. The flow volumes of the organic feed solution, hexone and water were in the ratio of 1.0:0.7:0.7. The resulting aqueous phase contained the columbium plus 0.45 percent tantalum while the stripped organic phase contained the tantalum plus 0.03 percent of columbium.

From the above, it may be seen that the present process represents an improved method for separating columbium and tantalum from a solution containing these metals and other impurities, particularly the transition metals. Further by employing the method of the present invention, it is possible to decrease substantially the number of steps necessary for separating columbium and tantalum. The instant method has also been found useful in the recovery of tantalum and columbium from ores as well as solutions containing either high or low concentrations of columbium and tantalum.

What is claimed is:

1. A process for coextracting columbium and tantalum values from a source material containing said metal values which comprises dissolving said source material in sufficient aqueous hydrofluoric acid solution to produce an aqueous solution having a hydrofluoric acid concentration of at least 5.5 normal in excess of that just necessary to dissolve said source material; further acidifying said aqueous acid solution of said source material with a strong mineral acid until the hydrogen ion concentration is at least about 12 normal in excess of the hydrogen ion concentration of the solution obtained by dissolving the source material in a minimum quantity of aqueous hydrofluoric acid; intimately contacting said further acidified aqueous acid solution of said source material with at least one organic extractant selected from the group consisting of lower aliphatic ketones, lower aliphatic esters, and lower aliphatic ethers which are substantially immiscible with the aqueous acid solution; whereby dissolved tantalum and columbium values are transferred to the organic extractant; and separating the organic phase and the aqueous phase from each other.

2. A process in accordance with claim 1 wherein the organic extractant is methyl isobutyl ketone.

3. A process for coextracting columbium and tantalum values from a source material containing said metal values which comprises dissolving said source material in sufficient aqueous hydrofluoric acid to produce an aqueous solution having a hydrofluoric acid concentration of at least 5.5 normal in excess of that just necessary to dissolve said source material; further acidifying said aqueous acid solution of said source material with at least one strong mineral acid selected from the group consisting of sulfuric acid and hydrofluoric acid until the hydrogen ion concentration exceeds by at least about 12 normal the hydrogen ion concentration of the solution obtained by dissolving the source material in a minimum quantity of aqueous hydrofluoric acid; intimately contacting said further acidified aqueous acid solution of said source material with at least one organic extractant selected from the group consisting of lower aliphatic ketones, lower aliphtic esters, and lower aliphatic ethers which are substantially immiscible with the aqueous acid solution whereby dissolved tantalum and columbium values are transferred to the organic extractant; and separating the organic phase and the aqueous phase from each other.

4. A process in accordance with claim 3 wherein the organic extractant is methyl isobutyl ketone.

5. A process for coextracting columbium and tantalum values from a source material containing said metal values which comprises dissolving said source material in sufficient aqueous hydrofluoric acid to produce an aqueous solution having a hydrogen ion concentration which exceeds by at least about 12 normal the hydrogen ion concentration of the solution obtained by dissolving the source material in a minimum quantity of aqueous hydrofluoric acid; intimately contacting said further acidified aqueous acid solution of said source material with at least one organic extractant selected from the group consisting of lower aliphatic ketones, lower aliphatic esters, and lower aliphatic ethers which are substantially immiscible with the aqueous acid solution whereby dissolved tantalum and columbium values are transferred to the organic extractant; and separating the organic phase and the aqueous phase from each other.

6. A process in accordance with claim 5 wherein the organic extractant is methyl isobutyl ketone.

7. A process for coextracting columbium and tantalum values from a source material containing said metal values which comprises dissolving said source material in sufficient aqueous hydrofluoric acid solution to produce an aqueous solution having a hydrofluoric acid concentration of at least 5.5 normal in excess of that just necessary to dissolve said source material; further acidifying said aqueous acid solution of said source material with sulfuric acid until the hydrogen ion concentration is at least about 12 normal in excess of the hydrogen ion concentration of the solution obtained by dissolving the source material in a minimum quantity of aqueous hydrofluoric acid; intimately contacting said further acidified aqueous acid solution of said source material with at least one organic extractant selected from the group consisting of lower aliphatic ketones, lower aliphatic esters, and lower aliphatic ethers which are substantially immiscible with the aqueous acid solution; whereby dissolved tantalum and columbium values are transferred to the organic extractant and separating the organic phase and the aqueous phase from each other.

8. A process in accordance with claim 7 wherein the organic extractant is methyl isobutyl ketone.

References Cited in the file of this patent

UNITED STATES PATENTS

| 2,773,737 | Nielson et al. | Dec. 11, 1956 |
| 2,795,481 | Hicks et al. | June 11, 1957 |
| 2,888,320 | McCord | May 26, 1959 |

FOREIGN PATENTS

| 767,038 | Great Britain | Jan. 30, 1957 |

OTHER REFERENCES

Rohmer: "Chemical Abstracts," vol. 36, col. 364 (1942).